US010434885B2

(12) United States Patent
Antonini et al.

(10) Patent No.: US 10,434,885 B2
(45) Date of Patent: Oct. 8, 2019

(54) LANDING PLATFORM FOR AN UNMANNED AERIAL VEHICLE

(71) Applicant: TELECOM ITALIA S.p.A., Milan (IT)

(72) Inventors: Roberto Antonini, Turin (IT); Gian Piero Fici, Turin (IT); Marco Gaspardone, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 424 days.

(21) Appl. No.: 15/500,291

(22) PCT Filed: Aug. 5, 2014

(86) PCT No.: PCT/EP2014/066790
§ 371 (c)(1),
(2) Date: Jan. 30, 2017

(87) PCT Pub. No.: WO2016/019978
PCT Pub. Date: Feb. 11, 2016

(65) Prior Publication Data
US 2017/0217323 A1    Aug. 3, 2017

(51) Int. Cl.
*B64C 39/02* (2006.01)
*B60L 11/18* (2006.01)
(Continued)

(52) U.S. Cl.
CPC ........... *B60L 11/1816* (2013.01); *B60L 53/14* (2019.02); *B60L 53/18* (2019.02); *B60L 53/30* (2019.02);
(Continued)

(58) Field of Classification Search
CPC ................. B64F 1/007; B64C 2201/18; B64C 2201/182; B64C 25/32
See application file for complete search history.

(56) References Cited

U.S. PATENT DOCUMENTS 8,708,277 B1     4/2014   McGeer et al.
2007/0228214 A1 * 10/2007  Horak ................... A63H 27/14
                                                    244/63

(Continued)

FOREIGN PATENT DOCUMENTS

EP    1 767 453 A1    3/2007
EP    2 213 570 A2    8/2010
(Continued)

OTHER PUBLICATIONS

International Search Report dated Apr. 7, 2015 in PCT/EP2014/066790 filed Aug. 5, 2014.
(Continued)

*Primary Examiner* — Philip J Bonzell
*Assistant Examiner* — Tye William Abell
(74) *Attorney, Agent, or Firm* — Oblon, McClelland, Maier & Neustadt, L.L.P.

(57) ABSTRACT

A landing platform for an unmanned aerial vehicle, including a plurality of substantially funnel-shaped centering housings configured to cooperate with a corresponding plurality of projections of the aerial vehicle for reaching a predetermined landing position. The platform can include a mechanism for recharging the battery of the aerial vehicle and/or with an arrangement for serial data transfer.

15 Claims, 5 Drawing Sheets

(51) Int. Cl.
  *B64C 25/52* (2006.01)
  *B64F 1/00* (2006.01)
  *B60L 53/14* (2019.01)
  *B60L 53/30* (2019.01)
  *B60L 53/60* (2019.01)
  *B60L 53/18* (2019.01)
  *B64C 25/32* (2006.01)

(52) U.S. Cl.
  CPC .............. *B60L 53/60* (2019.02); *B64C 25/52* (2013.01); *B64C 39/024* (2013.01); *B64F 1/007* (2013.01); *B60L 2200/10* (2013.01); *B64C 25/32* (2013.01); *B64C 2201/024* (2013.01); *B64C 2201/027* (2013.01); *B64C 2201/042* (2013.01); *B64C 2201/108* (2013.01); *B64C 2201/18* (2013.01); *B64C 2201/182* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01)

(56) References Cited

U.S. PATENT DOCUMENTS

| | | | |
|---|---|---|---|
| 2010/0193626 A1* | 8/2010 | Goossen | B64C 37/00 244/2 |
| 2011/0024559 A1* | 2/2011 | McGeer | B64C 25/68 244/110 F |
| 2012/0271461 A1 | 10/2012 | Spata | |
| 2012/0271491 A1 | 10/2012 | Spata | |
| 2013/0306791 A1 | 11/2013 | McGeer et al. | |
| 2014/0091176 A1 | 4/2014 | McGeer et al. | |
| 2014/0091177 A1 | 4/2014 | McGeer et al. | |
| 2014/0124621 A1* | 5/2014 | Godzdanker | B64F 1/125 244/110 E |
| 2014/0203140 A1 | 7/2014 | McGeer et al. | |
| 2016/0144982 A1* | 5/2016 | Sugumaran | B64C 25/32 244/103 R |
| 2016/0347192 A1* | 12/2016 | Lee | B64D 45/08 |

FOREIGN PATENT DOCUMENTS

| | | |
|---|---|---|
| EP | 2 218 642 A2 | 8/2010 |
| EP | 2 515 147 A2 | 10/2012 |
| WO | 2012/064891 A2 | 5/2012 |

OTHER PUBLICATIONS

Cocchioni, Francesco et al., "Autonomous Navigation, Landing and Recharge of a Quadrotor using Artificial Vision," 2014 International Conference on Unmanned Aircraft Systems (ICUAS), IEEE, May 27-30, 2014, XP032610484, pp. 418-429.

* cited by examiner

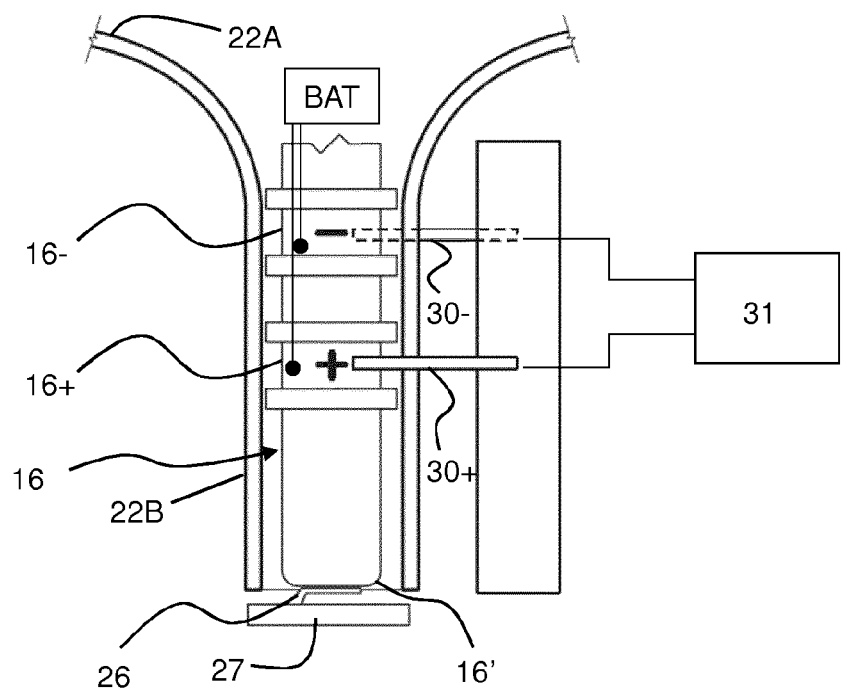
Fig. 3a
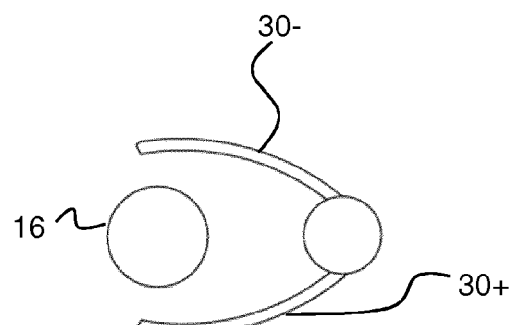
Fig. 4a.1
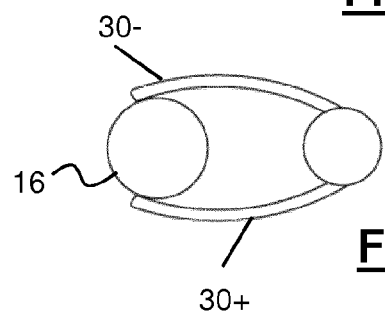
Fig. 4a.2

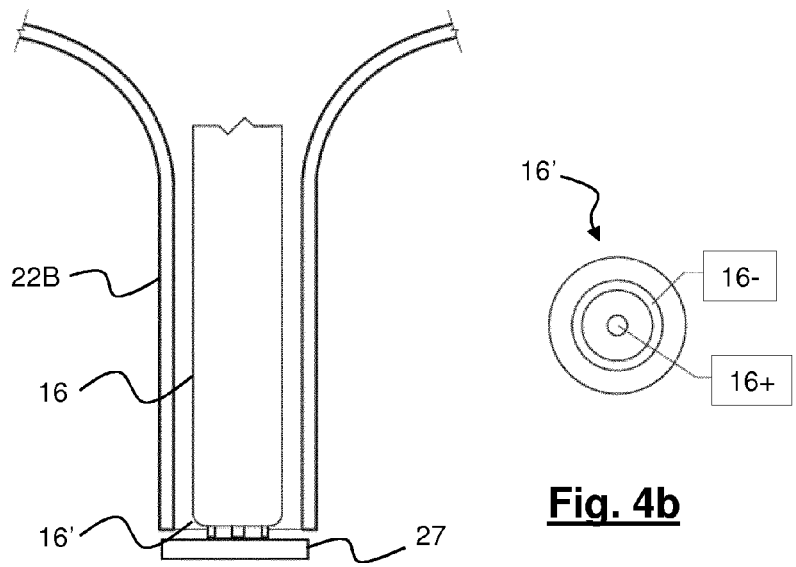
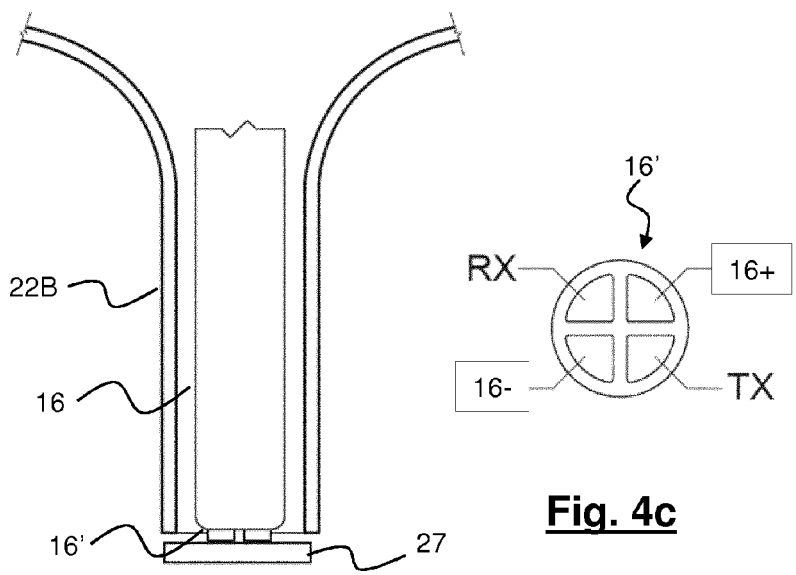

LANDING PLATFORM FOR AN UNMANNED AERIAL VEHICLE

The present invention relates to a landing (and take-off) platform for an unmanned VTOL (Vertical Take-Off and Landing) aerial vehicle. In one advantageous embodiment, the landing platform can be also suitable for recharging the batteries powering the unmanned aerial vehicle. The present invention also relates to an assembly comprising an unmanned aerial vehicle and a landing platform.

STATE OF THE ART

As is known, an unmanned aerial vehicle (briefly UAV or RPA, Remotely Piloted Aircraft), commonly known as drone, is an aircraft characterized by the absence of a human pilot on board. Its flight is controlled by a computer on board the aerial vehicle and/or on the ground, under the remote control of a pilot, typically on the ground, or of an autopilot, which can be on board or on the ground. Among the remotely piloted unmanned aerial vehicles, the vertical take-off ones have an exceptional hovering ability, thus automatically compensating for the wind and other disturbances of the flight.

The use of an unmanned aerial vehicle is well established for military use and is increasing also for civilian use, for example in operations of prevention and intervention in emergency fire, for use of non-military security, for surveillance of pipelines, with the purpose of remote sensing and monitoring, for research and development studies, and, more generally, in all cases in which said systems may allow execution of "dull, dirty and dangerous" missions with lower costs compared to conventional aircrafts.

An unmanned aerial vehicle can be advantageously used to quickly view a scene after a disaster, which makes the place inaccessible by land and by air to any other means of assistance, and to plan a proper intervention.

Each unmanned aerial vehicle can then be provided with one or more specific accessories for the mission, for example, a still camera, a video camera, a sensor or the like.

Small unmanned aerial vehicles operated by smartphone or tablet Wi-Fi wireless technology, having a wide-angle front camera used for the image streaming on the control device, are also known.

WO 2012/064 891 A2 discloses a docking system for an unmanned aerial vehicle (UAV). The system provides a stable landing and take-off area as well as, in some embodiments, refueling and/or data transfer capabilities. The docking system may include a landing surface, an orientation mechanism adjusts the landing surface to that provided for level landing area, and an alignment mechanism coupled with the landing surface moves in UAV resting on the landing surface to a predetermined location on the landing surface for automated refueling of the UAV. A latching mechanism may secure the UAV to the landing surface when the UAV is located at the predetermined location.

SUMMARY

The Applicant has noted that one of the main limitations to the use of an electrically powered unmanned aerial vehicle is the duration of the batteries and the consequent need to recharge them on a frequent basis and efficiently in less time.

Currently, once on the ground, the exhausted batteries are replaced with fully charged batteries or are manually connected to a power supply. Both solutions are cumbersome and not practical. Moreover the unmanned aerial vehicle is forced to move where a specific assistance is available which can be far from its theater of operations.

The Applicant has found that the docking system disclosed in WO 2012/064891, disadvantageously, requires a motorized alignment mechanism coupled to the landing surface that moves the aircraft in the recharging position. This mechanism is expensive, it must be made in a precise way, and it is subject to breaks that could affect the operation of the aircraft. In fact, unless the airplane is moved to the exact recharging location, recharging will not take place and the aircraft can not take off for a new mission.

The Applicant's object is to provide a landing platform for an unmanned aerial vehicle that allows the unmanned aerial vehicle to land in a centered position without the need for a motorized alignment mechanism.

According to the Applicant, this object can be achieved through a landing platform designed so as to comprise a plurality of centering housings suitably arranged and shaped so as to direct the landing unmanned aerial vehicle to a predetermined parking position.

According to the present invention, the unmanned aerial vehicle is provided with protruding elements, each protruding element being configured to engage the surface of one of the centering housings. Owing to the engagement between the protruding elements and corresponding shaped surfaces of the housings, the unmanned aerial vehicle becomes automatically positioned in the predetermined parking position, without the need to be pushed by a motorized mechanism. In this position, the batteries of the unmanned aerial vehicle can be recharged and/or the aerial vehicle tank can be filled and/or data obtained during flight can be downloaded and/or additional data (for instance, relating to future missions) can be uploaded in a memory of the unmanned aerial vehicle.

According to a first aspect, the present invention relates to a landing platform for an unmanned aerial vehicle, preferably an electrically powered unmanned aerial vehicle, comprising a plurality of substantially funnel-shaped centering housings configured so as to cooperate with a corresponding plurality of projections of the unmanned aerial vehicle (e.g. landing gears) for reaching a predetermined landing position.

Preferably, an axis of said funnel-shaped housings is coaxial with an axis of said projections.

The substantially funnel-shaped centering housings may comprise a substantially frusto-conical mouth and a tubular portion which extends downwardly from the bottom of the frusto-conical mouth.

Preferably, the substantially funnel-shaped centering housings are recessed with respect to a substantially flat surface and are arranged so as to limit the area of said substantially flat surface between said funnel-shaped housings.

In one embodiment, at least two of said substantially funnel-shaped centering housings are substantially tangent in the proximity of said substantially flat surface.

In one embodiment, there are provided a positive electrical contact and a negative electrical contact configured so as to cooperate with a corresponding positive electrical contact and with a corresponding negative electrical contact in at least one of said projections of the unmanned aerial vehicle for recharging a battery of said unmanned aerial vehicle.

The electrical contacts of the platform may comprise arms configured so as to embrace a projection of the unmanned aerial vehicle.

Preferably, the arms are staggered.

Preferably, the closure of said arms is controlled by a pressure sensor, preferably placed at the bottom of substantially funnel-shaped centering housings.

In one embodiment, the landing platform further comprises an arrangement for serial data transfer. Advantageously, the surface of said housings can be at least partially of a material that offers reduced friction with said projections.

In one embodiment, at least a portion of a surface of said substantially funnel-shaped centering housings substantially follows a logarithm curve.

According to a second aspect, the present invention relates to an assembly comprising an unmanned aerial vehicle and a landing platform according as set forth above.

The unmanned aerial vehicle can be a vertical landing and take-off unmanned aerial vehicle comprising a plurality of rotors and a plurality of projections, each being in the form of a cylindrical foot or the like, which extend downwardly from a fixed structure of the unmanned aerial vehicle.

BRIEF DESCRIPTION OF THE DRAWINGS

A detailed description of the invention is given herein by way of non limiting example, wherein:

FIG. 3a schematically partially shows a cylindrical centering foot with power arms and a lower contact (being a location contact and/or for data transfer);

FIG. 3b schematically shows an alternative electric contact arrangement;

FIG. 3c schematically shows an alternative electric contact arrangement combined with a data transfer arrangement;

FIGS. 4a.1 and 4a.2 schematically show a configuration with open and closed power arms, respectively;

FIG. 4b is a plan view of the foot of FIG. 3b;

FIG. 4c is a plan view of the foot of FIG. 3c;

DETAILED DESCRIPTION OF EMBODIMENTS

Figure 1:
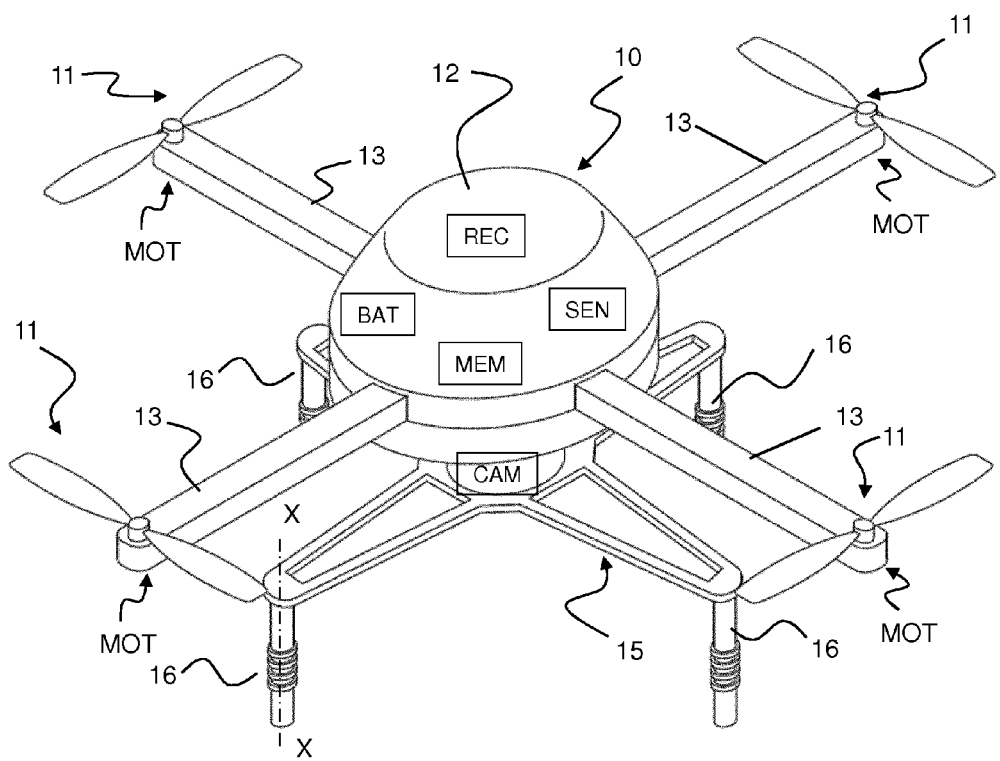
FIG. 1 schematically shows an unmanned aerial vehicle suitable to engage a landing platform according to the invention.

FIG. 1 shows, schematically, an unmanned aerial vehicle 10. In particular, FIG. 1 shows a vertical take-off unmanned aerial vehicle 10 provided with four rotors 11 connected to a central body 12 through four respective beams 13. Such a four rotors unmanned aerial vehicle is also referred to as "quadcopter". More generally, an unmanned aerial vehicle provided with a plurality of rotors is termed "multirotor". According to the present invention, the unmanned aerial vehicle 10 could have any number of rotors, four rotors, less than four rotors (for example one or three rotors) or more than four rotors (for example, six or eight rotors).

Inferiorly, the unmanned aerial vehicle according to the invention comprises a fixed landing gear comprising a structure 15 having horizontal arms (or a star-shaped single-arm) and a plurality of projections 16, in the form of supporting feet 16 facing downwards.

In the embodiment of FIG. 1, the number of feet 16 is four, each of them being connected to the respective ends of a four-pointed star shaped plate. As will become apparent in the following, such a four feet gear is particularly advantageous but, according to the invention, a lower number of feet or a greater number of feet could be provided.

The unmanned aerial vehicle 10 comprises motors MOT for rotating the rotor blades. Preferably, it comprises a motor MOT for each of the rotors 11. On board the unmanned aerial vehicle 10, for example in the central body 12, one or more batteries BAT and at least one receiver REC for wireless signals are provided. A camera CAM to take discrete pictures or videos during the flight and/or a sensor SEN can also be provided. Typically, a memory MEM can also be provided in order to store the data acquired during the flight and/or related to a subsequent mission. All of these components will not be further illustrated or described because they are per se known.

The supporting feet 16 are preferably identical to one another. Each foot 16 has substantially a cylinder shape with a vertical axis with a lower free end 16' and an upper end connected to the structure 15, possibly in the form of a star-shaped plate 15.

At least one of the supporting feet 16 (FIG. 3a) comprises a positive electrical contact 16+ and a negative electrical contact 16− connected with a corresponding positive pole and a corresponding negative pole of the battery(s) BAT on board the unmanned aerial vehicle 10. In one embodiment, each support foot 16 has electrical contacts 16+ and 16− connected to the poles of the battery BAT.

In other embodiments, each supporting foot 16 may have at least one of electrical contacts 16+ and 16−. For instance, when there are four feet, two of them may have respectively a positive and a negative electrical contact. Alternatively, two feet may have only a positive electrical contact and the other two only a negative electrical contact.

In still further embodiments, the two electrical contacts 16+ and 16− (or a single electrical contact) are provided only on a part of the supporting feet 16.

According to one embodiment (FIGS. 3a, 4a.1 and 4a.2), the positive electrical contact 16+ and the negative electrical contact 16− are provided on respective portions of the outer surface of the cylindrical foot 16 and are separated by insulators. For example, they could be in the form of metal rings or the like.

Alternatively (see FIGS. 3b and 4b), the electrical contacts 16+, 16− are provided in other positions, for example on the lower surface of the free end 16' of at least one foot (see FIGS. 3b and 4b). For example, as shown schematically in FIG. 4b, one of the two electrical contacts (16+ in FIG. 4b) could be provided at a central circle and the other one (contact 16− in FIG. 4b) at an outer circular crown.

Preferably, an arrangement for serial data transfer is provided. Preferably, such an arrangement is accessible from the lower surface of at least one of the feet 16 so that it can cooperate with a corresponding arrangement of (or connected to) the landing platform at the time of the aircraft landing. The contact for the serial data transfer is preferably connected to data memory MEM of any known type located on board the unmanned aerial vehicle 10.

FIGS. 3c and 4c show an alternative electric contact arrangement combined with a serial data transfer arrangement. According to such a further embodiment, the lower surface of each foot is substantially divided into four circular sectors: for example two diametrically opposed sectors can be for electrical contacts (16+ and 16−) and the other two diametrically opposed sectors for serial data transfer (one sector for receiving data (Rx) and the other for transmitting data (Tx)).

Figure 2:
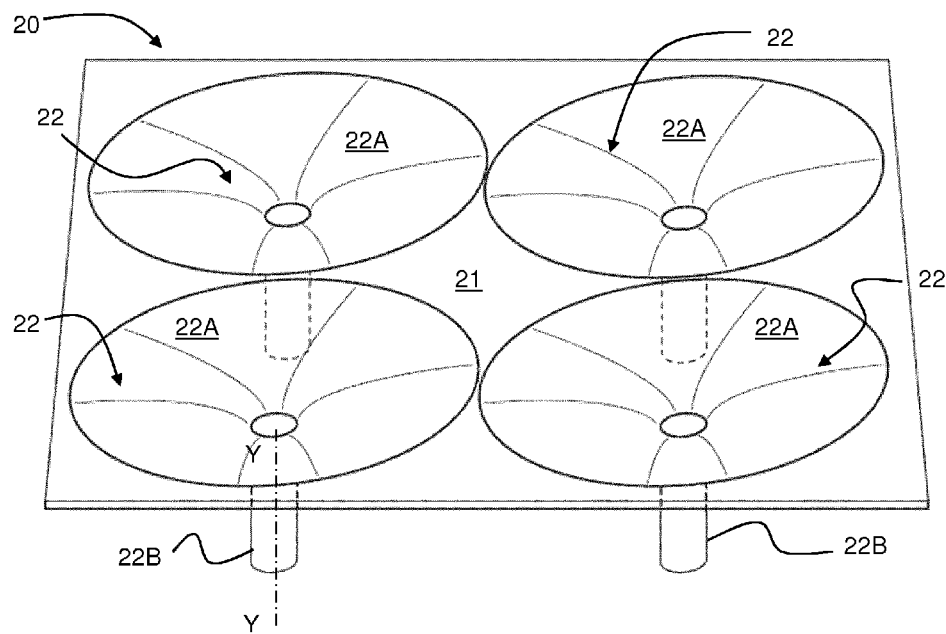
FIG. 2 schematically shows a landing platform according to the present invention.

According to the present invention, the landing platform 20 may comprise a substantially flat surface 21 and a plurality of centering housings 22 recessed with respect to the flat surface. The housings 22 are suitably arranged and shaped so that the unmanned aerial vehicle 10, once landed, slides and moves to a predetermined parking position. In the embodiment of FIG. 2, there are four housings 22, each of them being substantially in the form of a funnel.

The number of housings 22 and their arrangement preferably corresponds to the number and the arrangement of the support feet 16 of the unmanned aerial vehicle 10. Therefore, if the support feet 16 are four and the axes X-X of the feet are located at the four vertexes of a square, likewise the axes Y-Y of the centering housings are arranged in correspondence of the four vertexes of a square with side length equal to that of the side of the square of the feet.

Preferably, each centering housing 22 comprises a substantially frusto-conical mouth 22A and a tubular portion 22B which extends downward from the bottom of the frusto-conical mouth 22A. Overall, the shape of centering housing 22 is a funnel shape. Preferably, the housings 22 are substantially tangent two by two. This reduces the amount of flat surface 21 between a centering housing 22 and the other and reduces the risk that, while landing, one of the feet 16 rests on the flat surface 21 and is not guided towards the center of the centering housings 22. The axis Y-Y of the funnel-shaped housings 22 is coaxial with the axis X-X of the projections 16.

FIG. 3a shows schematically a portion of a supporting foot 16 at the bottom of a funnel-shaped housing 22. The foot is shown in engagement with two arms 30+, 30−, connected to the ends of a power supply 31 of electric energy. The two arms 30+, 30− are staggered to avoid contact between the two poles.

FIG. 3a also schematically shows a presence contact 26, at the lower end 16' of a foot 16. This contact can be for reporting that the foot has reached its bottom position.

FIGS. 4a.1 and 4a.2 schematically show the arms in open and closed configuration, respectively.

In the closed configuration, the arms 30+, 30− embrace and retain the foot 16, and then the unmanned aerial vehicle 10, to the landing platform 20. Once the arms are opened, the unmanned aerial vehicle 10 is free to take off for a new mission.

The substantially funnel-shaped housings 22 ensure the unmanned aerial vehicle 10 to slide from an inaccurate landing position to an optimal and perfectly centered landing and parking position. In the optimal position, each foot 16 is loose in the cylindrical part 22B of the housings 22. At least one of the feet may then be held by the arms closed during recharging of the batteries or can still be retained for safety reasons. Preferably, all of the feet may be retained.

The unmanned aerial vehicle 10 is retained to the platform 20 through the tightened arms; this is a very advantageous feature, for example when the landing platform is rigidly connected on the roof of a vehicle and the unmanned aerial vehicle is transported therewith: the unmanned aerial vehicle 10 is not likely to separate from the platform 20, which is firmly fixed, and is ready to take off as soon as the charging arms are opened.

According to one embodiment, the mass of the unmanned aerial vehicle 10 makes sure that the lower end 16' of the feet is in contact with suitable supporting surfaces 27. A contact 26 may be provided at the support surface, as shown in FIG. 3a.

The closure of the arms 30+, 30− can be activated by a presence contact (such as contact 26 of FIG. 3a) or by any other sensor that detects the presence of a foot in a suitable position. When the charge is completed (or upon operation from a centralized management system) the arms 30+, 30− may open to let the unmanned aerial vehicle take off substantially without friction and constraints.

In addition to facilitating the landing phase, the combination between the cylindrical feet 16 and the shape of the housings 22 also facilitates the take-off and makes sure that it occurs along the (or in proximity of) vertical direction. In fact, the tubular portions 22B of the housings 22 guide the feet 16 in the first part of the take-off phase. Furthermore, in a second part of the take-off phase, the deviation with respect to the direction of vertical takeoff is however limited by the recessed shape of the housings 22.

Advantageously, the landing platform 20 according to the present invention also comprises an approaching and pointing system, (for example based on marker tracking). This system allows the unmanned aerial vehicle to be positioned substantially vertically relative to the platform and, even automatically, to land ensuring a very precise descent of the unmanned aerial vehicle, for example, with errors of a few centimeters only. The marker tracking could be based on an optical and/or radio and/or infrared system.

Figure 5:
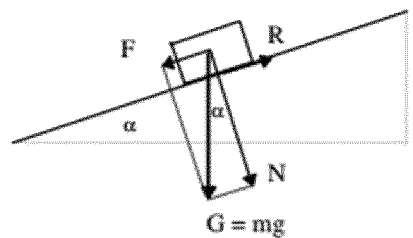
FIG. 5 shows the forces acting in the contact between a foot and the surface of a centering housing.

With reference to FIG. 5, the minimum inclination of the mouth 22A will now be considered so that an unmanned aerial vehicle 10 that lands on a platform 20 according to the invention is actually driven in a parking position. In order to evaluate the sliding, and therefore the necessary inclination, the forces at stake should be taken into account.

If G is the weight on the single foot (corresponding to the overall weight of the unmanned aerial vehicle, divided by the number of feet, four in the illustrated embodiment), F is the force which tends to make it move toward the inlet (a component of the weight parallel to the sliding plane) and N is the pressing force (a component of the weight perpendicular to the sliding plane) the following formula is obtained $$F = G^* \sin \alpha > f^* G^* \cos \alpha \qquad [1]$$

and then $$\sin \alpha > f \cos \alpha \qquad [2]$$

$$f < \operatorname{tg} \alpha \qquad [3]$$

where "α" is the inclination angle of the sliding plane with respect to a horizontal position, "f" is the friction coefficient between the material of the surface of the housing and the end surface of the feet.

Therefore, given the friction coefficient f, the minimum angle of inclination to ensure that an unmanned aerial vehicle "slides" towards the optimum parking position will be given by:

$$\alpha > \operatorname{arctg} f \qquad [4]$$

For example, in case the material of the surface of the housings and of the end of the feet is Teflon™, a coefficient f=0.04 would be obtained, and then the minimum angle will be equal to α=0.039=2.3°.

In the case of steel-aluminum an angle α at least equal to 0.55, corresponding to about 31°, would be needed.

In general, the greater is the inclination of the housings 22 with respect to the flat surface, the greater the speed and reliability with which the unmanned aerial vehicle 10 reaches the optimal parking position. In any case, the friction coefficient must still be kept low so as to prevent the unmanned aerial vehicle from stopping along the path.

Figure 6:
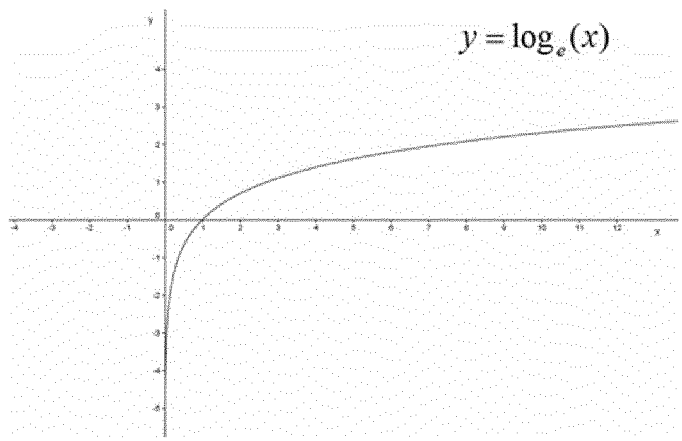
FIG. 6 shows an embodiment of profile curve of a housing of the landing platform of the present invention.

The inclination of the mouth 22A may have different shapes depending on the materials and/or the available space. According to one embodiment, the mouth 22A is in the form of a substantially truncated cone, with minimum inclination defined above. According to another embodiment, the shape could be represented by a function of the natural logarithm represented in FIG. 6, which guarantees an inclination such as to allow an "accompanied" sliding of the feet to the inlet created by the curve itself.

According to the present invention, a landing platform 20 for an unmanned aerial vehicle 10 is therefore provided which allows the unmanned aerial vehicle to land on an equipped workstation, which ensures an efficient electrical connectivity between the recharging system on board the unmanned aerial vehicle and a battery charger (or power supply) of the recharge platform. Advantageously, the present invention ensures recharge times which are comparable to those obtained with the classical charge systems used to date for the battery packs.

According to the present invention, accuracy is required in the landing phase of the unmanned aerial vehicle. However, the required accuracy is not such as to require the connectors positioned on the platform to be centered. In fact, the shape of the housings ensures the unmanned aerial vehicle to slide towards the parking position and optimum charge without the need for further active translation systems of the unmanned aerial vehicle towards the optimal position, or any human intervention.

According to the present invention the number of funnel-shaped housings (and thus the number of supporting feet) is greater than one. Advantageously, it can be three or four. In addition to other advantages reported in the present description, this allows to keep the central part of the unmanned aerial vehicle free for example, for a camera and/or a sensor.

According to the embodiment of the present invention, one or more feet can (also) be used for the networking component, allowing the download of the data collected by the unmanned aerial vehicle during a mission and/or the storing of data in a memory on board the unmanned aerial vehicle. This avoids having complex and heavy equipment on board to transfer the data collected (or used) during a flight.

The present invention is applicable to any VTOL unmanned aerial vehicle.

The invention claimed is:

1. A landing platform for an unmanned aerial vehicle, comprising:
a plurality of substantially funnel-shaped centering housings configured to cooperate with a corresponding plurality of projections of the unmanned aerial vehicle for reaching a predetermined landing position;
a positive electrical contact and a negative electrical contact configured to cooperate with a corresponding positive electrical contact and with a corresponding negative electrical contact in at least one of the projections of the unmanned aerial vehicle for recharging a battery of the aerial vehicle;
wherein the electrical contacts of the platform comprise arms configured to embrace a projection of the unmanned aerial vehicle.

2. The landing platform of claim 1, wherein an axis of the funnel-shaped housings is coaxial with an axis of the projections.

3. The landing platform of claim 1, wherein the substantially funnel-shaped centering housings comprise a substantially frusto-conical mouth and a tubular portion that extends downwardly from a bottom of the frusto-conical mouth.

4. The landing platform of claim 1, wherein the arms are staggered so that each arm cooperates with the projection at a different height of the projection.

5. The landing platform of claim 1, further comprising an arrangement for serial data transfer.

6. The landing platform of claim 1, wherein a surface of the substantially funnel-shaped centering housings is at least partially of a material that offers reduced friction with the projections.

7. The landing platform of claim 1, wherein at least a portion of a surface of the substantially funnel-shaped centering housings substantially follows a logarithm curve.

8. The landing platform of claim 1, further comprising a substantially flat surface, wherein the substantially funnel-shaped centering housings are recessed with respect to the substantially flat surface.

9. The landing platform of claim 8, wherein at least two of the substantially funnel-shaped centering housings are substantially tangent in proximity of the substantially flat surface.

10. The landing platform of claim 1, wherein closure of the arms towards the projection is controlled by a pressure sensor.

11. The landing platform of claim 4, wherein closure of the arms towards the projection is controlled by a pressure sensor.

12. An assembly comprising an unmanned aerial vehicle and a landing platform according to claim 1.

13. The assembly of claim 12, wherein the unmanned aerial vehicle is a vertical takeoff unmanned aerial vehicle comprising a plurality of rotors and a plurality of projections, each being in a form of a cylindrical foot, which extend downwardly from a fixed structure of the unmanned aerial vehicle.

14. The assembly of claim 12, wherein the unmanned aerial vehicle further comprises a plug/socket arrangement to transfer data between the unmanned aerial vehicle and the landing platform.

15. The assembly of claim 13, wherein the unmanned aerial vehicle further comprises a plug/socket arrangement to transfer data between the unmanned aerial vehicle and the landing platform.

* * * * *